United States Patent

Araseki et al.

[11] 4,005,277
[45] Jan. 25, 1977

[54] ECHO CONTROLLER COMPRISING A MODE SWITCH FOR SWITCHING ECHO SUPPRESSOR AND CANCELLER

[75] Inventors: Takashi Araseki; Kazuo Ochiai; Takashi Ogihara; Shunji Tanaka, all of Tokyo, Japan

[73] Assignee: Nippon Electric Company, Ltd., Tokyo, Japan

[22] Filed: Sept. 4, 1975

[21] Appl. No.: 610,372

[30] Foreign Application Priority Data

Sept. 5, 1974   Japan .................. 49-102794

[52] U.S. Cl. .................. 179/170.2; 179/170.6
[51] Int. Cl.² .................. H04B 3/20
[58] Field of Search ......... 179/170.2, 170.6, 170.8

[56] References Cited

UNITED STATES PATENTS

| | | | |
|---|---|---|---|
| 3,508,017 | 4/1970 | Unruc, Jr. .................. | 179/170.2 |
| 3,754,105 | 8/1973 | Poschenrieder et al. ...... | 179/170.2 |
| 3,894,200 | 7/1975 | Campanella et al. ......... | 179/170.6 |

Primary Examiner—William C. Cooper
Assistant Examiner—Randall P. Myers

[57] ABSTRACT

An echo controller comprises a parallel circuit of an echo suppressor and a self-adaptive echo canceller near an echo path of a long-distance telephone network. The echo controller further comprises a mode switch responsive to levels of a received signal, an unprocessed signal, and an output signal of the echo canceller and operable during absence of double talk for suspending operation of the echo canceller and putting instead the echo suppressor into operation only when characteristics of the echo path and operation of the echo canceller are objectionable.

5 Claims, 4 Drawing Figures

ECHO CONTROLLER COMPRISING A MODE SWITCH FOR SWITCHING ECHO SUPPRESSOR AND CANCELLER

BACKGROUND OF THE INVENTION

This invention relates to an echo controller, as called herein, for obviating an undesirable echo signal in a long-distance telephone network.

A long-distance telephone network generally comprises a plurality of two-wire and four-wire circuits or lines and a hybrid coil or circuit at each junction of the two-wire and four-wire lines. Each two-wire line serves as both of a signal receiving and sending path. Each four-wire line comprises an incoming or receiving path and an outgoing or sending path. Due to inevitable mismatch of impedance, the hybrid circuit delivers a fraction of a telephone or voice signal sent from the four-wire line to the two-wire line, namely, from a remote subscriber to a local subscriber, as an undesirable echo signal back to the remote subscriber. The hybrid circuit thus unavoidably serves as an echo path. It is conventional in order to obviate the echo signal to use either an echo suppressor or an echo canceller in the vicinity of each junction. A first of three terminals of a conventional echo canceller or suppressor for receiving a signal from the receiving path of the four-wire line, a second thereof for receiving a signal from the sending path thereof, and a third thereof for sending a signal to the sending path are generally known as a receiver-in (or received), a send-in (or unprocessed), and a send-out (or transmitting) terminal, respectively. The signals at these terminals are called in terms of the corresponding terminals.

A conventional echo suppressor is responsive to a receive-in (i.e. received) and a send-in (i.e. unprocessed) signal and produces an echo suppressed signal as a send-out (i.e. transmitted) signal. An echo suppressor is featured by its simple structure but is disadvantageous in that it irresistively introduces defects or impediments into conversation, such as omission of beginning of an interrupting voice signal sent from the local subscriber to a remote subscriber during presence of an existing voice signal sent from the latter to the former.

A sophisticated echo canceller comprises an echo simulator responsive to a receive-in signal for producing a simulated or synthesized echo signal or echo simulation signal and a subtractor for subtracting the echo simulation signal from a send-in signal to produce an echo cancelled signal as a send-out signal. The send-in signal is referred to as an "unprocessed" signal since it has yet to undergo either echo cancellation or echo suppression as will be more fully described. The echo simulator retains a set of parameters determined in compliance with approximated or estimated characteristics of the echo path. The echo cancelled signal consists of a residual echo signal when there is no double talk in the lines, namely, when the local subscriber does not speak to a remote subscriber while the latter is already speaking to the former. The residual echo signal should ideally be of a zero level but provides in practice a finite cancellation error. Inasmuch as the characteristics of an echo path may fluctuate from time to time, it is preferred that an echo canceller further comprises self-adaptive means responsive to the residual echo signal for adjusting or modifying the echo simulator so as to produce a least possible residual echo signal. Self-adaptively adjusted, the echo simulator changes the echo simulation signal when the current characteristics of the echo path becomes different from the previously estimated characteristics of the echo path. An echo canceller is theoretically preferred to an echo suppressor because of absence of the above-mentioned impediments but loses its function under certain circumstances, such as when a large noise appears in the lines, when the echo path characteristics are non-linear, and/or when a large variation occurs in the echo path characteristics.

In U.S. Pat. No. 3,754,105 issued to Poschenrieder et al., a circuit arrangement is disclosed wherein an echo suppressor is used in cascade after a self-adaptive echo canceller in the sending path of a four-wire line with a view to obviating the loss of function of the latter. The echo suppressor receives as its send-in signal the send-out signal of the echo canceller and is rendered operative only when the echo simulator of the echo canceller is self-adaptively adjusted beyond a predetermined amount due to the line noise, nonlinearity of the echo path characteristics, and/or fluctuation in the echo path characteristics. As will readily be understood, the echo simulator is disturbed or adversely adjusted to a considerable extent at the beginning of double talk even if the echo path is of excellent characteristics, namely, little subject to noise, of considerably linear characteristics, and of little fluctuating characteristics. As a result, the circuit arrangement still develops the inherent defects of an echo suppressor at the beginning of double talk. The echo simulator is considerably adjusted also during presence of a large fluctuation in the echo path characteristics. When double talk occurs in this circumstance, the echo simulator is unduely disturbed. This causes a disturbance to the echo canceller output signal and, in some cases, produces an amplified echo signal therein. Responsive to such a send-in signal, the echo suppressor is liable to send a contaminated send-out signal to the sending path.

SUMMARY OF THE INVENTION

It is therefore an object of the present invention to provide an echo controller operable as an echo canceller for lines little subjected to noise and accompanied by a high-quality echo path that has little non-linearity and fluctuation in its characteristics, and operable as an echo suppressor for suppressing the echo signal in low-graded lines without producing a contaminated send-out signal even when the echo canceller operates only unsatisfactorily.

An echo controller according to this invention is responsive to a receive-in signal supplied from a receiving path of a four-wire line of a long-distance telephone network and to a send-in signal supplied from a sending path of the four-wire line to supply the sending path with a send-out signal substantially free from an echo signal inevitably produced by an echo path formed at a junction of the four-wire line and a two-wire line of the network. The echo controller comprises a self-adaptive echo canceller, an echo suppressor, and a mode switch. The echo canceller is of a known type and comprises an adjustable echo simulator responsive to the receive-in signal for producing an echo simulation signal simulating the echo signal, a subtractor for subtracting the echo simulation signal from the send-in signal to produce an echo cancelled signal, and means responsive to the echo cancelled signal for adjusting the echo simulator during absence of double talk in the four-wire line to improve simulation by the echo simulation signal of the echo signal. The echo suppressor is also of a known type and responds to the receive-in and send-in signals to produce an echo suppressed signal. For example, the echo suppressor may comprise a comparator for comparing levels of the receive-in and send-in signals to produce a switching signal when the former is higher than the latter and means responsive to the switching signal for producing the send-in signal as an echo suppressed signal. The mode switch responds to levels of the receive-in, send-in, and echo cancelled signals to selectively supply one of the echo cancelled and suppressed signals to the sending path as the send-out signal.

The mode switch normally supplies the echo cancelled signal to the sending path and evaluates characteristics of the echo path and operation of the echo canceller to substitute the echo suppressed signal for the echo cancelled signal only when the characteristics and operation are objectionable. The mode switch monitors the double talk and carries out switching between the echo cancelled and suppressed signals in the absence of the double talk. For example, the mode switch is responsive to levels of said receive-in, send-in and echo cancelled signals for detecting the absence of double talk and evaluating the simulation of the echo signal with respect to a predetermined criterion in order that the send out signal may be switched during the absence of double talk from the echo cancelled signal to the echo suppression signal in cases where the simulation is worse than said criterion.

DESCRIPTION OF THE PREFERRED EMBODIMENTS

Figure 1:
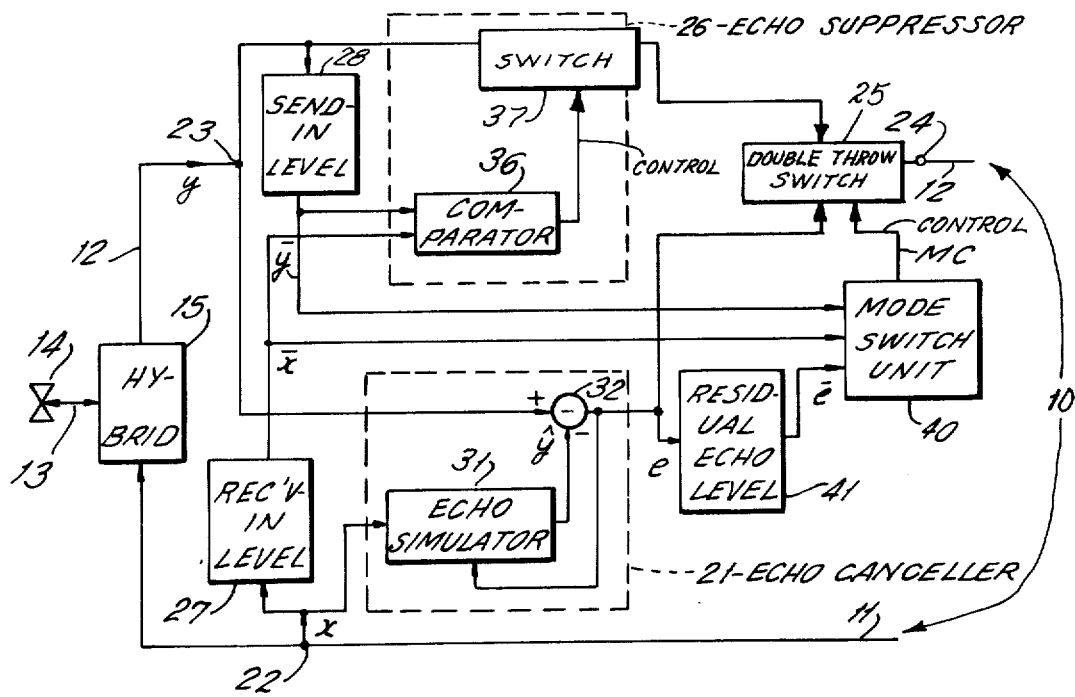
FIG. 1 shows in blocks an echo controller according to an embodiment of the instant invention together with a subscriber's substation and a portion therefor of a long-distance telephone network.

Referring to FIG. 1, a long-distance telephone network comprises a four-wire line 10 comprising, in turn, a receiving path 11 and a sending path 12. The network further comprises a two-wire line 13 coupled to a local subscriber's substation 14. A hybrid circuit 15 is used at a junction of the four-wire and two-wire lines 10 and 13. As described hereinabove, the hybrid circuit 15 inevitably serves as an echo path which produces an undesirable echo signal in response to a voice signal sent from a remote subscriber, whose substation is not shown, to the local subscriber through the receiving path 11. An echo controller according to an embodiment of the present invention comprises a self-adaptive echo canceller 21 connected to the receiving path 11 at a receive-in terminal 22 to receive a receive-in signal $x$ therefrom and interposed in the sending path 12 so as to receive a send-in signal $y$ at a send-in terminal 23 and supply a send-out signal to a send-out terminal 24 through a changeover switch 25 to be described later. When only a remote subscriber is sending a voice signal to the local subscriber, the receive-in and send-in signals $x$ and $y$ are the voice signals arriving at the receive-in terminal 21 and an echo signal generated by the echo path. The remote subscriber's substation is also accompanied by a two-wire and a four-wire line, a hybrid circuit, and an echo controller according to this invention.

Further referring to FIG. 1, the echo controller comprises an echo suppressor 26 which is connected to the receiving and sending paths 11 and 12 in parallel with the echo canceller 21. More particularly, the echo suppressor 26 receives the receive-in and send-in signals $x$ and $y$ at the receive-in and send-in terminals 22 and 23 and supplies an echo suppressed signal as another send-out signal to the send-out terminal 24 through the changeover switch 25. Responsive to the receive-in and send-in signals $x$ and $y$, a pair of circuits 27 and 28 for measuring levels of these signals, depicted outside of the echo suppressor 26 for convenience of description, produce signals $\bar{x}$ and $\bar{y}$ representative of the respective levels. In the example being illustrated, the echo canceller 21 comprises an echo simulator 31 and a subtractor 32. Responsive to the receive-in signal $x$, the echo simulator 31 produces an echo simulation signal $\hat{y}$. The subtractor 32 subtracts the echo simulation signal $\hat{y}$ from the send-in signal $y$ to produce an echo cancelled signal, which is normally supplied to the send-out terminal 24 as the send-out signal through the changeover switch 25. As has been pointed out hereinabove, the echo cancelled signal is a residual echo signal $e$ when double talk is absent in the lines 10 and 13 and is used to self-adaptively adjust the echo simulator 31 so as to reduce the cancellation error. Although not shown for simplicity of illustration, a speech detector and an accompanying switch described, for example, in U.S. Pat. No. 3,499,999 issued to Sondhi, should be resorted to so as to suspend the self-adaptive adjustment of the echo simulator 31 during presence of the double talk. Alternatively, the echo canceller 21 may be that disclosed in U.S. Pat. No. 3,787,645 issued to Ochiai et al. or U.S. Pat. No. 3,821,493 issued to Chiba. The echo suppressor 26 comprises a comparator 36 and an on-off switch 37. The comparator 36 compares the receive-in and send-in level signals $\bar{x}$ and $\bar{y}$ to produce a switching signal that switches the on-off switch 37 off only when the former is higher than the latter. The signal delivered through the on-off switch 37 to the changeover switch 25 is an echo suppressed signal. Although again not shown, the echo suppressor 26 preferably comprises known means for giving an attenuation of several decibels to the receive-in signal $x$ when the local subscriber is speaking to a remote subscriber in order to facilitate detection of the double talk.

Again referring to FIG. 1, the echo controller further comprises a mode switch comprising, in turn, the above-mentioned changeover switch 25, a mode switch unit 40, and a circuit 41 responsive to the residual echo signal $e$ for producing a signal $\bar{e}$ representative of the level thereof. As will be described hereunder in detail, the changeover switch 25 responds to a first and a second switch changeover signal MC to supply the echo cancelled and suppressed signals, respectively, to the send-out terminal 24. The mode switch unit 40 comprises first means responsive to the receive-in and send-in level signals $\bar{x}$ and $\bar{y}$ for producing during absence of the double talk a timing signal indicative of a lapse of a predetermined interval after growth of the receive-in signal $x$ beyond a first predetermined level. The unit 40 further comprises second means responsive to the send-in and echo cancelled or residual echo level signals $\bar{y}$ and $\bar{e}$ for evaluating characteristics of the echo path and operation of the echo canceller 21 to produce the second switch changeover signal MC only when the double talk is absent and when the send-in and echo cancelled level signals $\bar{y}$ and $\bar{e}$ are higher than a second predetermined level and a predetermined fraction of the send-in signal level $\bar{y}$ to indicate objectionable characteristics and unsatisfactory operation, respectively, and to produce otherwise the first switch changeover signal MC. Thus, the mode switch selectively supplies one of the echo cancelled and suppressed signals to the send-out terminal 24.

Figure 2:
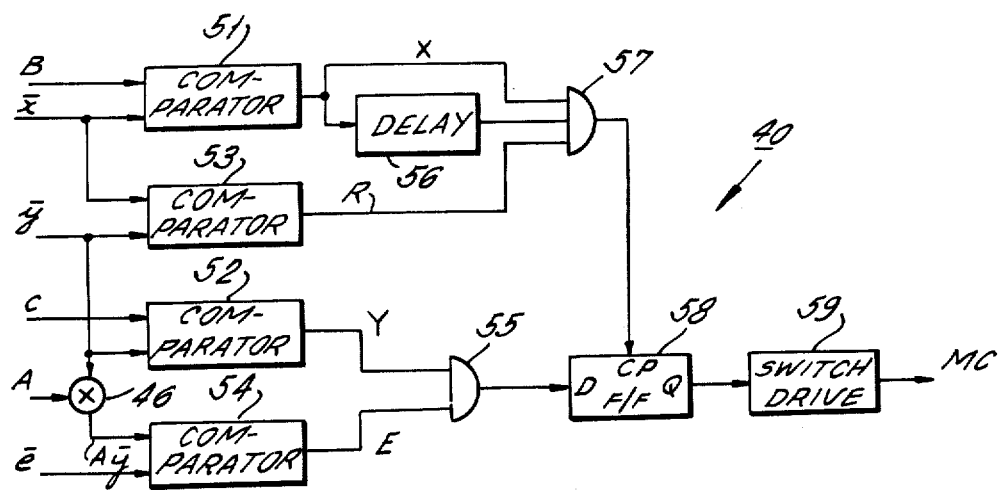
FIG. 2 is a block diagram of a mode switch unit for use in an echo controller according to this invention.
Figure 3:
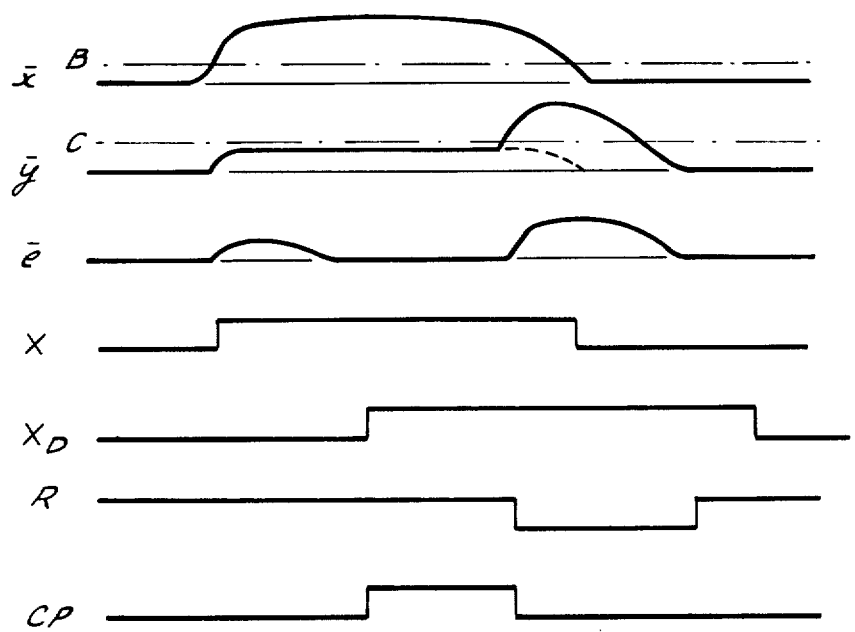
FIG. 3 schematically illustrates signals appearing at several points in the mode switch unit depicted in FIG. 2.

Referring to FIGS. 2 and 3, the mode switch unit 40 comprises a multiplier 46 supplied with the send-in level signal $\bar{y}$ and an input signal representative of a first constant or predetermined level A lower than unity for producing a product signal representative of a predetermined fraction A$\bar{y}$ of the send-in signal level $\bar{y}$, a first comparator 51 for comparing the receive-in level signal $\bar{x}$ with another input signal representative of a second constant or predetermined level B to produce a first result signal X, a second comparator 52 for comparing the send-in level signal $\bar{y}$ with a third input signal representative of a third constant or predetermined level C to produce a second result signal Y, a third comparator 53 for comparing the receive-in and send-in level signals $\bar{x}$ and $\bar{y}$ to produce a third result signal R, and a fourth comparator 54 for comparing the residual echo level signal $\bar{e}$ with the product signal of the level A$\bar{y}$ to produce a fourth result signal E. The first result signal X assumes a logic 1 and a logic 0 level depicted in FIG. 3 by a higher and a lower level when a receive-in signal x is present and absent to render the receive-in signal level $\bar{x}$ higher and lower than the second predetermined level B. The second result signal Y assumes a logic 1 and a logic 0 level when noise in present in the lines 10 and 13 and/or when characteristics of the echo path are poor and/or undergo fluctuation to render the send-in signal level $\bar{y}$ higher than the third level C and when the echo path has excellent characteristics to render the send-in signal level $\bar{y}$ lower than the third level C, respectively. The third result signal R assumes a logic 1 and a logic 0 level when double talk is absent and present to render the receive-in signal level $\bar{x}$ higher and lower than the send-in signal level $\bar{y}$. The second result signal Y also indicates presence and absence of double talk but is used herein to evaluate characteristics of the echo path. The fourth result signal E assumes a logic 1 and a logic 0 level when the echo canceller 21 operates unsatisfactorily and satisfactorily to render the residual echo signal level $\bar{e}$ higher and lower than the send-in signal level fraction A$\bar{y}$.

Further referring to FIGS. 2 and 3, the mode switch unit 40 comprises a first AND gate 55 responsive to the second and fourth result signals Y and E for producing a first output signal representative of a logic product of these two signals Y and E. It will be understood that the first output signal assumes a logic 1 level only when characteristics of the echo path are objectionable and operation of the echo canceller 21 is unsatisfactory. The first output signal remains in a logic 0 level when the characteristics are excellent and/or when the echo canceller 21 operates satisfactorily. The mode switch unit 40 further comprises a delay circuit 56 responsive to the first result signal X for producing a delayed signal $X_D$. The delay given by the delay circuit 56 to the first result signal X is determined in consideration of the time for the self-adaptive echo canceller 21 to respond to a receive-in signal $x$ in sufficiently cancelling the echo signal and of the time of duration of a vowel. If the echo path has excellent characteristics, the echo canceller 21 produces a substantially zero residual echo signal $e$ within about 150 milliseconds after appearance of a receive-in signal $x$. The duration of a vowel is at least 200 milliseconds. The delay may therefore be 150 milliseconds.

Still further referring to FIGS. 2 and 3, the mode switch unit 40 comprises a second AND gate 57, a flip-flop circuit 58 having a clock, an input, and an output terminal CP, D, and Q, and a switch drive circuit 59. Responsive to the first result signal X, delayed signal $X_D$, and third result signal R, the second AND gate 57 supplies a second output signal to the clock terminal CP. When a receive-in signal x continues longer than 150 milliseconds and so long as no double talk occurs, the second output signal becomes logic 1 to indicate a lapse of the 150-millisecond interval and occurrence of no double talk in the meanwhile. The second output signal thus has a leading edge that serves as the timing signal mentioned hereinabove. On the other hand, the first output signal is supplied to the D input terminal from the first AND gate 55. When both of the first and second output signals are not of the logic 1 level, namely, either of different logic levels or of the logic 0 level, the flip-flop circuit 58 supplies a logic 0 signal to the switch drive circuit 59 to make the latter produce the first switch changeover signal MC. When the echo controller is already operating in an echo cancellation mode of supplying the echo cancelled signal to the send-out terminal 24, the first switch changeover signal MC does not alter the mode of operation. When the echo controller is operating in an echo suppression mode of supplying the echo suppressed signal to the send-out terminal 24, the first switch changeover signal MC switches the echo controller into the echo cancellation mode. The flip-flop circuit 58 produces a logic 1 signal only when both of the first and the second output signals are of the logic 1 level. In this event, the switch drive circuit 59 produces the second switch changeover signal MC for making the echo controller operate in the echo suppression mode. An echo canceller 21 may favorably operate even with nonlinear and/or fluctuating echo path characteristics and/or in the presence of noise in the lines 10 and 13. So long as operation of the echo canceller 21 is favorable, the mode switch keeps the echo cancellation mode of operation of the echo controller. It is when the echo canceller 21 would not operate satisfactorily even after a lapse of the predetermined interval and when no double talk is present that the echo controller is switched into the echo suppression mode.

Figure 4:
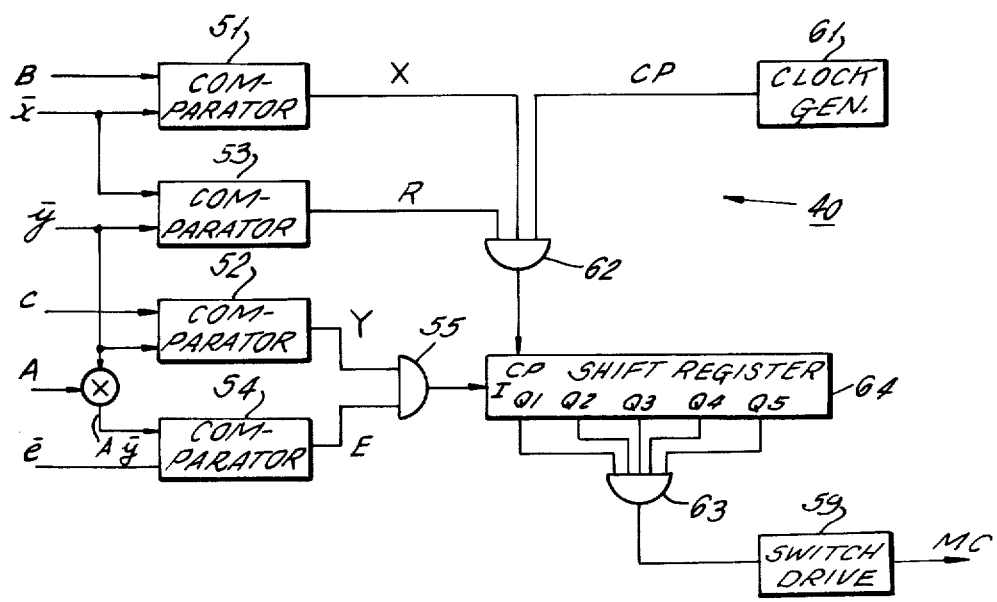
FIG. 4 is a block diagram of another mode switch unit for use in an echo controller according to this invention.

Finally referring to FIG. 4, another mode switch unit 40 comprises, instead of the delay circuit 56, second AND gate 57, and flip-flop circuit 58 illustrated with reference to FIGS. 2 and 3, a clock generator 61, another second AND gate 62, a third AND gate 63, and a shift register 64. The clock generator 61 produces clock pulses CP, a duration for a predetermined number of which corresponds to the predetermined interval. The shift register 64 has the predetermined number of stages. In the example being illustrated, a duration for five clock pulses CP corresponds to the 150-millisecond interval. In other words, the clock pulses CP have a period of 30 milliseconds. Enabled only when the receive-in signal level $\bar{x}$ is above the second predetermined level B and when double talk is absent, the second AND gate 62 allows passage therethrough of the clock pulses CP to a clock terminal CP of the shift register 64. The shift register 64 thus steps in response to these clock pulses CP to measure a lapse of time after appearance of a receive-in signal $x$ so long as no double talk occurs meanwhile. The last one of the predetermined number of the clock pulses CP allowed to pass through the second AND gate 62 thereof corresponds to the above-mentioned timing signal in this example of the mode switch unit 40. On the other hand, the first output signal of the first AND gate 55 is supplied to an input terminal 1 of the shift register 64. When the first output signal is of the logic 1 level at least throughout the predetermined interval after appearance of a receive-in signal $x$, namely, at least until the time of occurrence of the timing signal, because of objectionable characteristics of the echo path and unsatisfactory operation of the echo canceller 21, the shift register 64 eventually produces logic 1 signals from five output terminals Q1, Q2, Q3, Q4, and Q5 of the respective stages. Responsive to these logic 1 signals, the third AND gate 63 produces a logic 1 output signal to make the switch drive circuit 59 produce, in turn, the second switch changeover signal MC. When the first output signal is or becomes logic 0 before production of the timing signal and occurrence of double talk because characteristics of the echo path are or have become excellent and/or because operation of the echo canceller 21 is or has become satisfactory, at least one of the signals produced from the output terminals Q1–Q5 is or becomes logic 0 to make the third AND gate 63 produce a logic 0 output signal. The switch drive circuit 59 now produces the first switch changeover signal MC.

With the mode switch, of which unit 40 is illustrated with reference to FIG. 4, characteristics of the echo path and operation of the echo canceller 21 are checked the predetermined number of times to switch the echo controller into the echo suppression mode only when objectionable characteristics and operation are found in every instance. The mode switch may fail to detect occurrence of double talk when the local subscriber's voice signal is of a low level. It may appear that the echo cancellation becomes insufficient. This, however, is not the case in practice because it is very unlikely that a voice signal has a constant level throughout the check carried out at least the predetermined number of times.

In the examples of the mode switch unit 40, the second and third predetermined levels B and C correspond to the first and second predetermined levels mentioned with reference to FIG. 1 and in the appended claims. The first through fourth comparators 51–54 correspond to the third, first, fourth, and second comparators set forth in the appended claims. The third means recited in the appended clams may comprise either the flip-flop circuit 58 or the shift register 64. The changeover switch 25 should preferably be an electronic switch. The on-off switch 37 may also be an electronic switch or, as the case may be, a variable impedance. The echo suppressor 26 may be of any other type, such as that comprising a center clipper for rendering zero a small-amplitude signal or that comprising a pair of complementary interdigital filters in the receiving and sending paths 11 and 12, respectively. The subtractor 31 may be any other equivalent means. The AND gates may be replaced with other logic circuits together with corresponding modification, if necessary, of the logic signals.

What is claimed is:

1. An echo controller responsive to a received signal supplied from a receiving path of a four-wire line of a long-distance telephone network and to an unprocessed signal supplied to the input of a sending path of said four-wire line for supplying said sending path with a transmitted signal substantially free from an echo signal inevitably produced by an echo path formed at a jucntion of said four-wire line and a two-wire line of said network, said echo controller comprising:

a self-adaptive echo canceller which comprises an adjustable echo simulator responsive to said received signal for producing an echo simulation signal simulating said echo signal, a subtractor for substracting said echo simulation signal from said unprocessed signal to produce an echo cancelled signal, and means responsive to said echo cancelled signals for adjusting said echo simulator during the absence of double talk in said four-wire line to improve simulation by said echo simulation signal of said echo signal;

an echo suppressor comprising a comparator for comparing levels of said received and unprocessed signals for producing a switching signal when the former is higher than the latter and means responsive to said switching signal for producing said unprocessed signal as an echo suppressed signal; and mode switch means responsive to levels of said received, unprocessed, and echo cancelled signals for detecting the absence of double talk and evaluating the simulation of said echo signal with respect to a predetermined criterion to switch, during the absence of double talk, said transmitted signal from said echo cancelled signal to said echo suppression signal when said simulation is worse than said criterion.

2. An echo controller as claimed in claim 1, wherein said mode switch further comprises:

a changeover switch responsive to a first and a second switch changeover signal generated in accordance with the aforesaid determinations for supplying either said echo cancelled signal or said suppressed signal, respectively, to said sending path as said transmitted signal;

first means responsive to the levels of said received and unprocessed signals for producing during absence of said double talk a timing signal indicative of a lapse of a predetermined interval after growth of said received signal beyond a first predetermined level; and second means responsive to the levels of said unprocessed and echo cancelled signals and to said timing signal for evaluating characteristics of said echo path and operation of said echo canceller to produce said second switch changeover signal only when said double talk is absent and when said unprocessed and echo cancelled signal levels are higher than a second predetermined level and a predetermined fraction of said unprocessed signal level, respectively, and to produce otherwise said first switch changeover signal.

3. An echo controller as claimed in claim 2, wherein said second means comprises:
- a first comparator for comparing said unprocessed signal level with said second predetermined level to produce a first result signal which assumes a logic 1 and a logic 0 level when said unprocessed signal level is higher and lower than said second predetermined level;
- a second comparator for comparing said echo cancelled signal level with said unprocessed signal level fraction to produce a second result signal which assumes a logic 1 level and a logic 0 level when said echo cancelled signal level is higher and lower than said unprocessed signal level fraction to indicate unsatisfactory and satisfactory operation of said echo canceller;
- a first AND gate responsive to said first and second result signals for producing a first output signal representative of a logic product of said first and second result signals; and
- third means responsive to said timing and output signals for producing said second switch changeover signal when said timing signal is present and when said output signal assumes a logic 1 level and for otherwise producing said first switch changeover signal.

4. An echo controller as claimed in claim 3, wherein said first means comprises:
- a third comparator for comparing said received signal level with said first predetermined level to produce a third result signal which assumes a logic 1 and a logic 0 level when said received signal level is higher and lower than said first predetermined level to indicate presence and absence of said received signal;
- a fourth comparator for comparing said received and unprocessed signal levels to produce a fourth result signal which assumes a logic 1 and a logic 0 level when said received signal level is higher and lower than said unprocessed signal level to indicate absence and presence of said double-talk;
- a delay circuit for giving a delay of said predetermind interval to said third result signal to produce a delayed signal; and
- a second AND gate responsive to said third result, delayed, and fourth result signals for producing a second output signal representative of a logic product of said third result, delayed, and fourth result signals and having a leading edge serving as said timing signal;
- said third means comprising a flip-flop circuit having a D input, a clock, and a Q output terminal and responsive to said first and second output signals supplied to said D input and clock terminals for producing from said Q output terminal a logic 1 signal only when said first and second output signals are of the logic 1 level and a logic 0 signal otherwise, said logic 1 and 0 signals serving as said second and first switch changeover signals, respectively.

5. An echo controller as claimed in claim 3, wherein said first means comprises:
- a third comparator for comparing said received signal level with said first predetermined level to produce a third result signal which assumes a logic 1 and a logic 0 level when said received signal level is higher and lower than said first predetermined level to indicate presence and absence of said received and unprocessed signal levels to produce a fourth reslt signal which assumes a logic 1 and a logic 0 level when said received signal level is higher and lower than said unprocessed signal level to indicate absence and presence of said double talk;
- a clock generator for generating clock pulses, a duration for a predetermined number of the clock pulses corresponding to said predetermined interval; and
- a second AND gate enabled by said third and fourth result signals of the logic 1 level to allow passage therethrough of the clock pulses, the last one of said predetermined number of the clock pulses allowed to pass through said second AND gate serving as said timing signal;
- said third means comprising:
- a shift register having said predetermined number of stages and responsive to said first output signal and to the clock pulses allowed to pass through said second AND gate for producing stage output signals which all assume a logic 1 level when said first output signal assumes the logic 1 level throughout said predetermined interval; and
- a third AND gate responsive to said stage output signals for producing a logic 1 output signal when all said stage output signals assume the logic 1 level and a logic 1 0 output signal otherwise, said logic 1 and 0 signals serving as said second and first changeover signals.

* * * * *